US012368016B2

(12) United States Patent
Lemaitre et al.

(10) Patent No.: US 12,368,016 B2
(45) Date of Patent: Jul. 22, 2025

(54) X-RAY TUBE CATHODE FOCUSING ELEMENT

(71) Applicant: GE Precision Healthcare LLC, Waukesha, WI (US)

(72) Inventors: Sergio Lemaitre, Whitefish Bay, WI (US); Kevin Kruse, Muskego, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 0 days.

(21) Appl. No.: 18/750,862

(22) Filed: Jun. 21, 2024

(65) Prior Publication Data

US 2024/0347310 A1 Oct. 17, 2024

Related U.S. Application Data

(62) Division of application No. 17/558,412, filed on Dec. 21, 2021, now Pat. No. 12,046,441.

(51) Int. Cl.
*H01J 35/14* (2006.01)
*H01J 3/38* (2006.01)
*H01J 35/06* (2006.01)
*H01J 35/26* (2006.01)

(52) U.S. Cl.
CPC ................ *H01J 35/14* (2013.01); *H01J 3/38* (2013.01); *H01J 35/066* (2019.05); *H01J 35/26* (2013.01); *H01J 2235/0233* (2013.01); *H01J 2235/068* (2013.01)

(58) Field of Classification Search
None
See application file for complete search history.

(56) References Cited

U.S. PATENT DOCUMENTS

| | | | | | |
|---|---|---|---|---|---|
| 3,916,202 | A * | 10/1975 | Heiting | H01J 35/147 | 378/138 |
| 4,685,118 | A * | 8/1987 | Furbee | H05G 1/08 | 378/114 |
| 5,515,413 | A * | 5/1996 | Knudsen | H01J 35/066 | 378/138 |
| 6,236,713 | B1 * | 5/2001 | True | H01J 35/147 | 378/138 |
| 6,438,207 | B1 * | 8/2002 | Chidester | H01J 35/153 | 378/138 |
| 6,762,540 | B2 * | 7/2004 | Schaefer | H01J 35/066 | 313/302 |
| 6,801,599 | B1 * | 10/2004 | Kautz | H01J 35/066 | 378/138 |
| 6,968,039 | B2 * | 11/2005 | Lemaitre | H01J 35/147 | 378/138 |

(Continued)

*Primary Examiner* — Thomas R Artman

(57) ABSTRACT

Various methods and systems are provided for an X-ray tube cathode focusing element. In one example, a focusing element is configured with a first side positioned adjacent to an electrode plate. An insulator having a first side is positioned adjacent the electrode plate and a second, opposite side adjacent to a cathode base. The focusing element has at least three filaments of different sizes positioned in respective channels of different widths, where each of the at least three filaments are coupled to two current feedthroughs, each current feedthrough configured with a leg extending through a central, hollow space of the focusing element, the electrode plate, the insulator, and the cathode base.

11 Claims, 9 Drawing Sheets

(56) References Cited

U.S. PATENT DOCUMENTS

| | | | | |
|---|---|---|---|---|
| 7,657,002 | B2 * | 2/2010 | Burke | H01J 35/064 378/136 |
| 7,828,621 | B2 * | 11/2010 | Lemaitre | H01J 35/066 445/50 |
| 7,860,219 | B2 * | 12/2010 | Clark | H01J 3/027 378/136 |
| 8,451,976 | B2 * | 5/2013 | Canfield | H01J 35/147 378/138 |
| 8,831,178 | B2 * | 9/2014 | Lemaitre | H01J 35/064 378/136 |
| 10,032,595 | B2 * | 7/2018 | Lamaitre | H01J 3/18 |
| 10,121,629 | B2 * | 11/2018 | Lemaitre | H01J 35/066 |
| 11,114,268 | B2 * | 9/2021 | Tsujino | H01J 35/116 |
| 11,791,122 | B2 * | 10/2023 | Lee | H01J 35/065 313/311 |
| 12,046,441 | B2 * | 7/2024 | Lemaitre | H01J 3/14 |
| 2002/0126798 | A1 * | 9/2002 | Harris | H01J 35/066 378/136 |
| 2004/0081282 | A1 * | 4/2004 | Schaefer | H01J 35/066 378/136 |
| 2005/0029957 | A1 * | 2/2005 | Lemaitre | H01J 35/147 315/160 |
| 2007/0183576 | A1 * | 8/2007 | Burke | H01J 35/064 378/136 |
| 2007/0232183 | A1 * | 10/2007 | Lemaitre | H01J 35/066 445/50 |
| 2010/0079053 | A1 * | 4/2010 | Andrews | H01J 3/027 313/326 |
| 2012/0027182 | A1 * | 2/2012 | Canfield | H01J 35/064 378/138 |
| 2014/0010354 | A1 * | 1/2014 | Lemaitre | H01J 35/066 219/121.64 |
| 2017/0250051 | A1 * | 8/2017 | Lamaitre | H01J 35/064 |
| 2018/0096816 | A1 * | 4/2018 | Lemaitre | A61B 6/40 |
| 2018/0211809 | A1 * | 7/2018 | Burke | H01J 35/064 |
| 2019/0035593 | A1 * | 1/2019 | Tsujino | H01J 35/045 |
| 2022/0246383 | A1 * | 8/2022 | Lee | H01J 35/065 |
| 2023/0197396 | A1 * | 6/2023 | Kruse | H01J 3/027 378/136 |
| 2023/0197397 | A1 * | 6/2023 | Lemaitre | H01J 3/38 378/62 |
| 2023/0290603 | A1 * | 9/2023 | Kruse | H01J 35/064 |
| 2024/0347310 | A1 * | 10/2024 | Lemaitre | H01J 3/14 |

* cited by examiner

X-RAY TUBE CATHODE FOCUSING ELEMENT

CROSS-REFERENCE TO RELATED APPLICATIONS

This application is a divisional of U.S. application Ser. No. 17/558,412, filed on Dec. 21, 2021, the disclosure of which is incorporated herein by reference in its entirety.

FIELD

Embodiments of the subject matter disclosed herein relate to X-ray generation for imaging systems, such as, for example X-ray imaging systems.

BACKGROUND

In an X-ray tube, ionizing radiation is created by accelerating electrons in a vacuum from a cathode to an anode via an electric field. The electrons originate from a filament of a cathode assembly with current flowing therethrough. The filament may be heated by a current flowing through it to liberate electrons from the cathode and accelerate the electrons toward the anode. Additional filaments heated by currents at different voltages may be used to focus the electron beam towards the anode, and to influence the size and position of the X-ray emitting spot. The cathode may be configured with additional focusing elements such as, for example, a focusing architecture, to further influence the size and position of the X-ray emitting spot.

BRIEF DESCRIPTION

In one embodiment, an X-ray tube cathode is comprised of a cathode base, an insulator having a first side adjacent to the cathode base and a second, opposite side, a focusing element adjacent to the second side of the insulator, the focusing element having at least one channel with a filament arranged therein, and at least one focusing feature on either side of the at least one channel. The at least one channel has rounded channel edges and further includes a distance between the filament and channel edges of at least a threshold distance. The focusing element has a negative bias potential applied thereto with respect to a voltage applied to the filament arranged in the at least one channel, and the filament is insulated from the focusing element by the insulator. When an electron emission source (e.g., filament) is energized, electron emissions may be directed into a single electron beam by the focusing element and bias voltage thereof. In one example, the focusing element is configured with three electron emission sources, wherein each electron emission source may be independently activated to emit electrons and electron emissions of each electron emission source are directed into single electron beams respective to each electron emission source. Each single electron beam may be further focused by integrated edge focusing, which may include a plurality of channels of different widths, focusing features, lateral edge features, and rounded edges of the plurality of channels, focusing features, and lateral edge features.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description.

Furthermore, the claimed subject matter is not limited to implementations that solve any disadvantages noted above or in any part of this disclosure.

BRIEF DESCRIPTION OF THE DRAWINGS

The present method and system for a cathode will be better understood from reading the following description of non-limiting embodiments, with reference to the attached drawings, wherein below:

FIGS. 2-7 are shown approximately to scale although other relative dimensions may be used.

DETAILED DESCRIPTION

Figure 1:
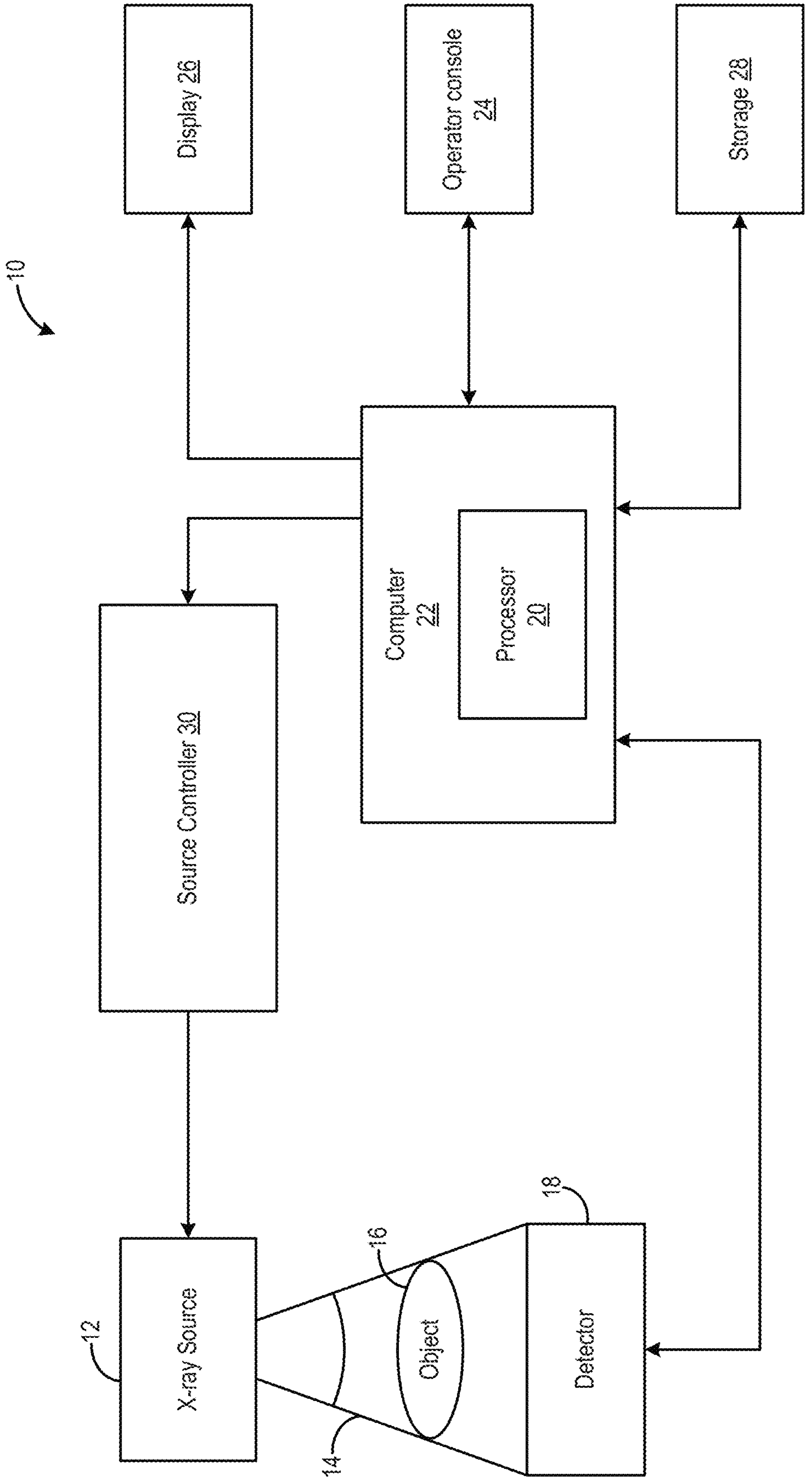
FIG. 1 shows a block diagram of an example of an imaging system.
Figure 2:
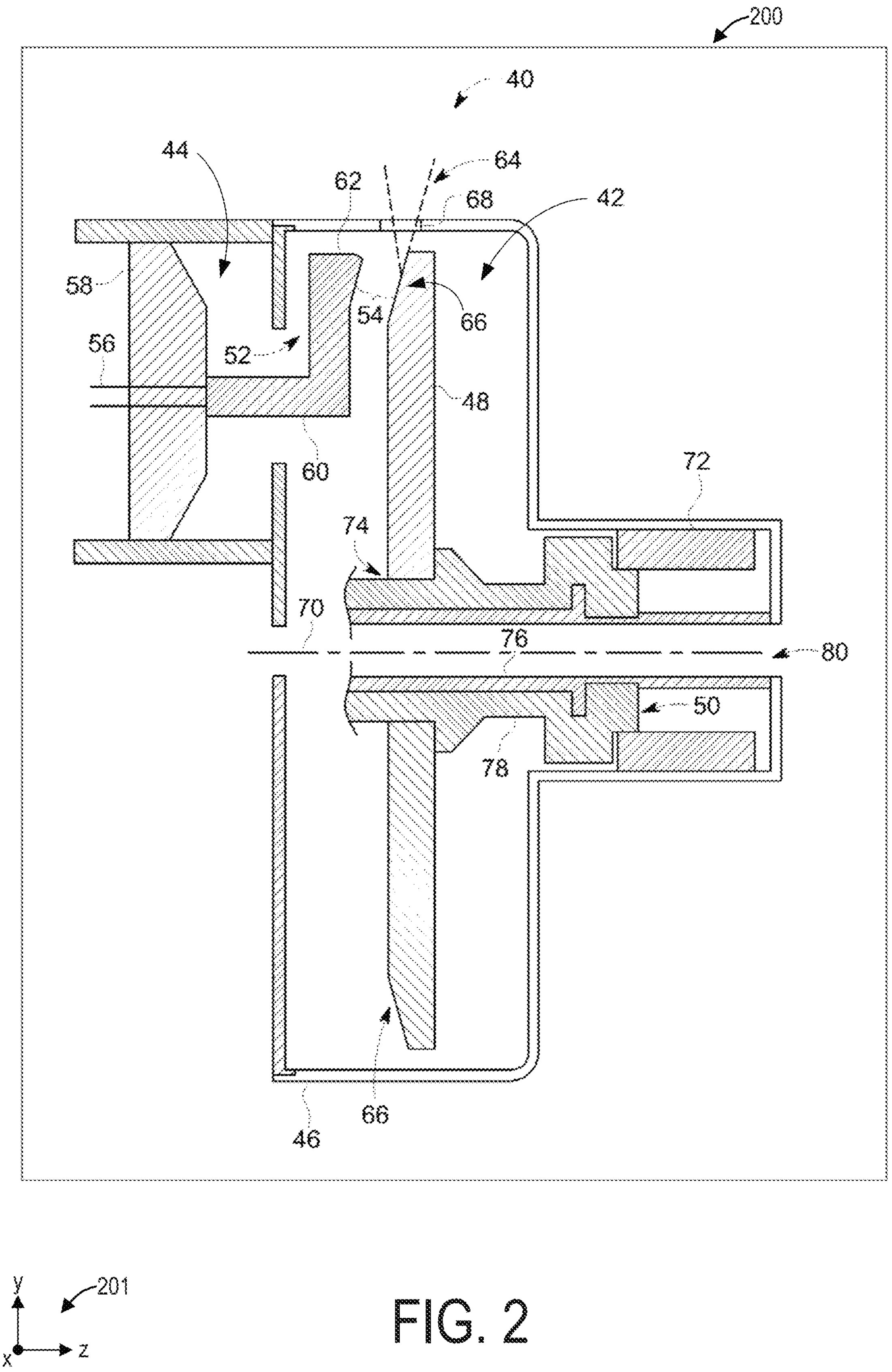
FIG. 2 shows a cross-sectional view of a portion of an X-ray tube which may be included in the imaging system of FIG. 1.
Figure 3:
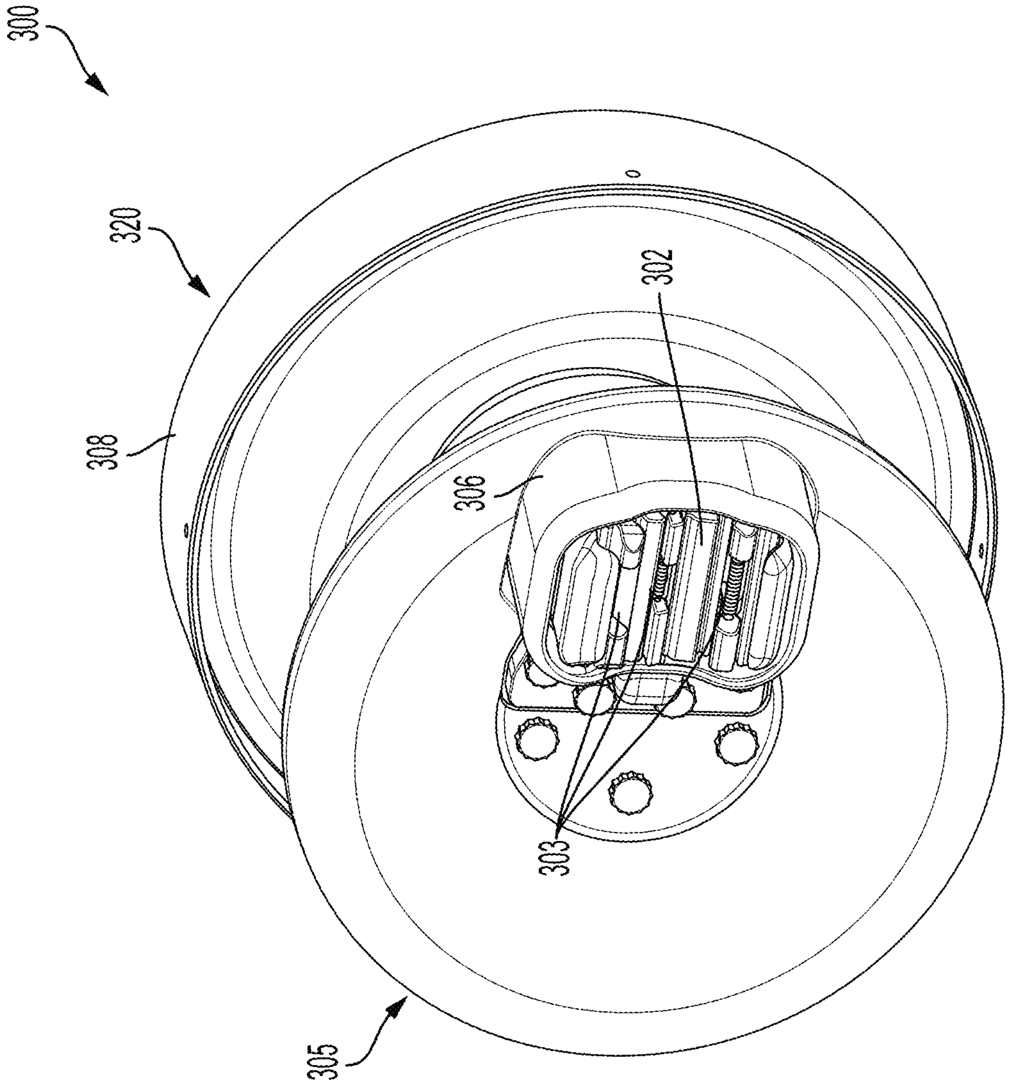
FIG. 3 shows a perspective view of a cathode assembly.
Figure 4:
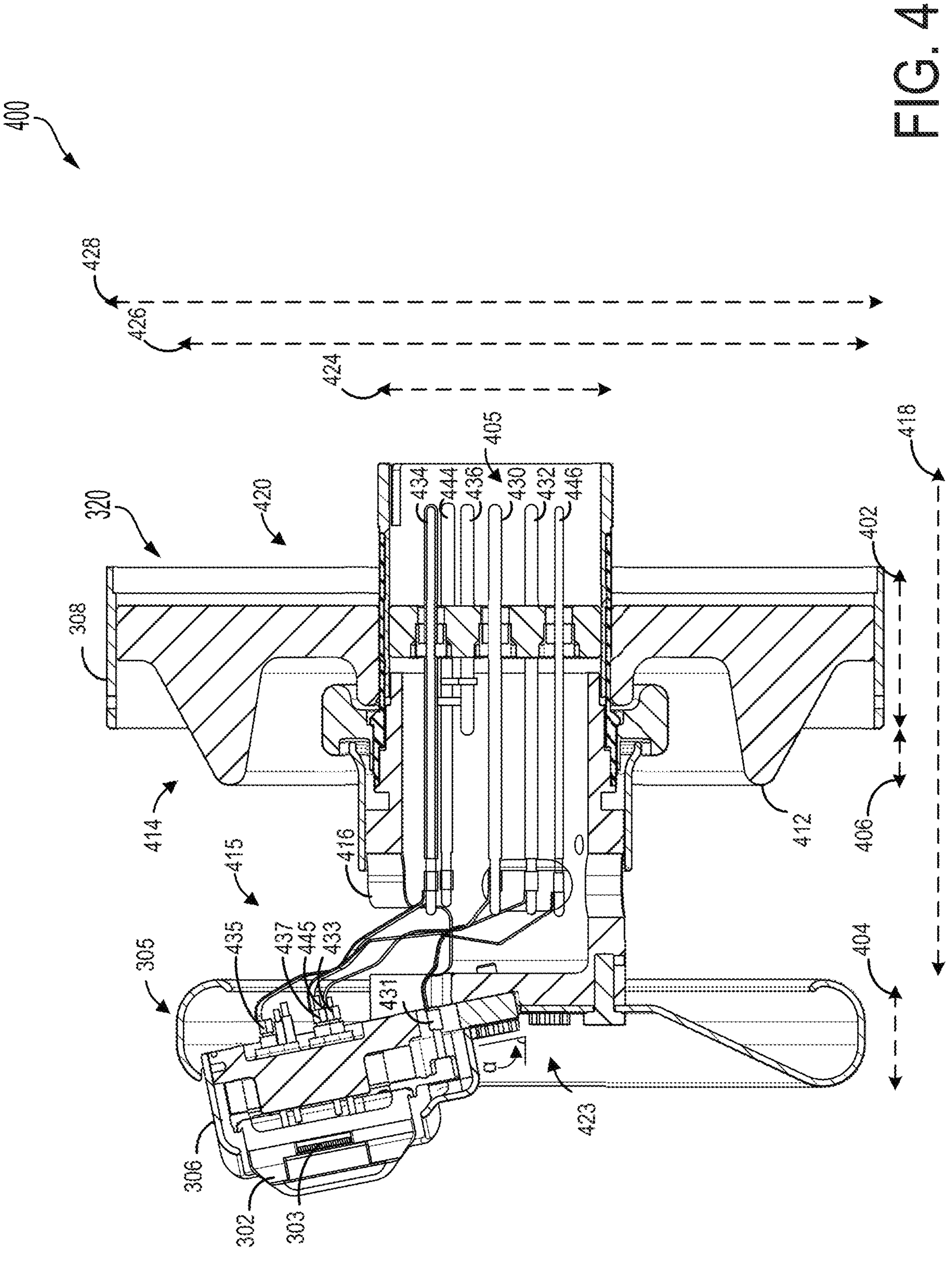
FIG. 4 shows a cross-sectional view of the cathode assembly.
Figure 5A:
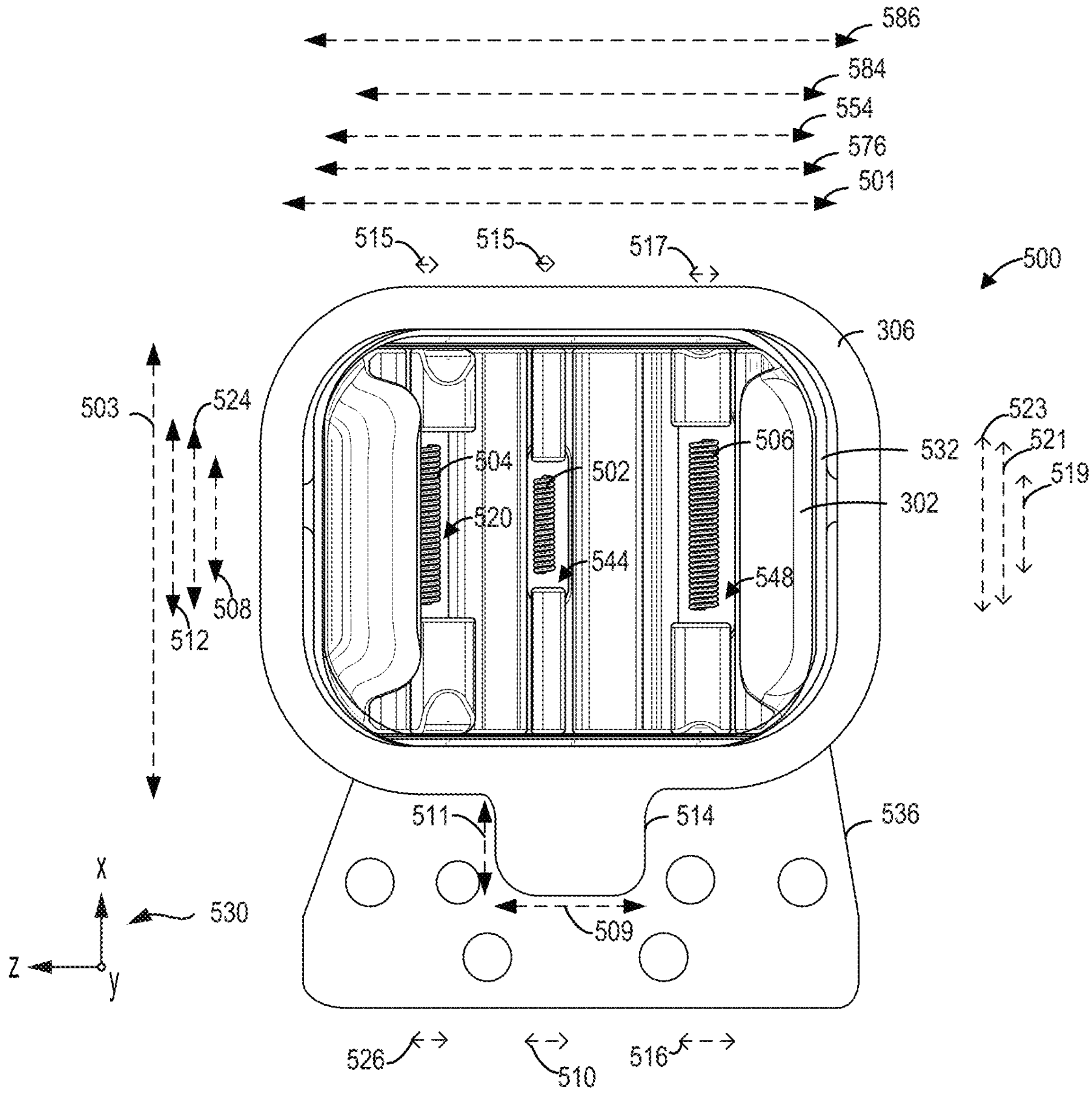
FIG. 5A shows a top-down view of a cathode cup, including a focusing element.
Figure 5B:
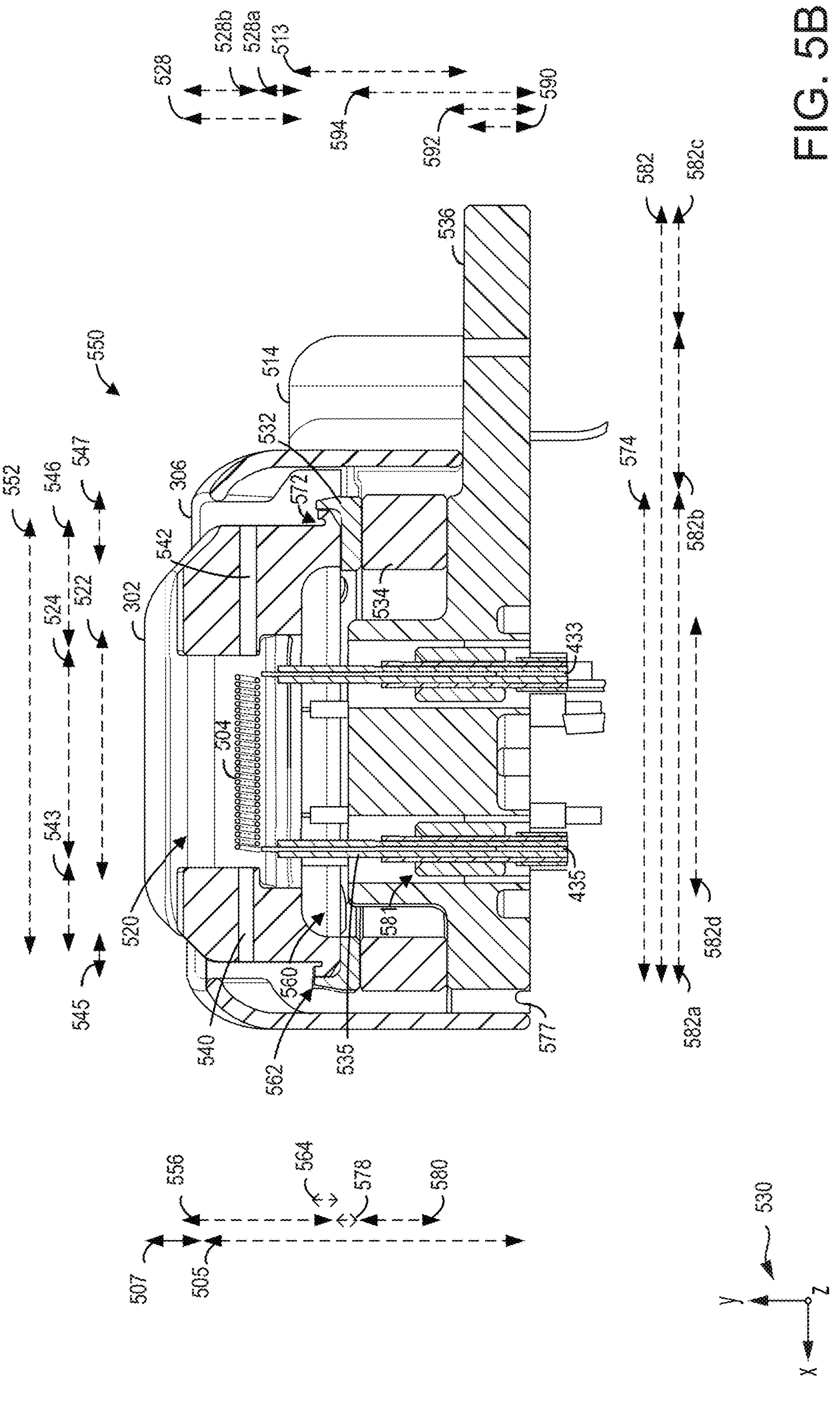
FIG. 5B shows a cross-sectional view of the cathode cup, including the focusing element.
Figure 6:
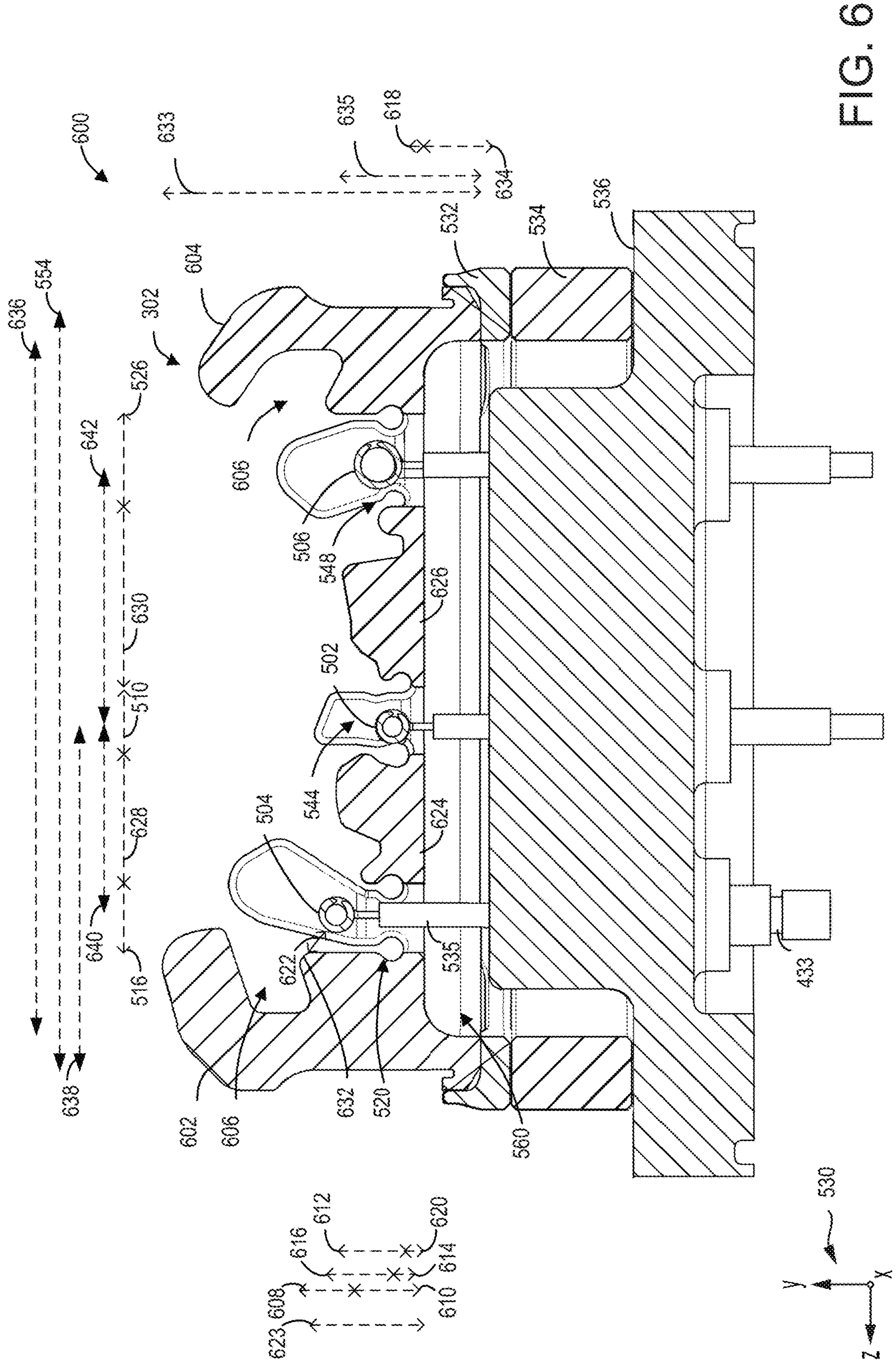
FIG. 6 shows a cross-sectional view of the focusing element.
Figure 7:
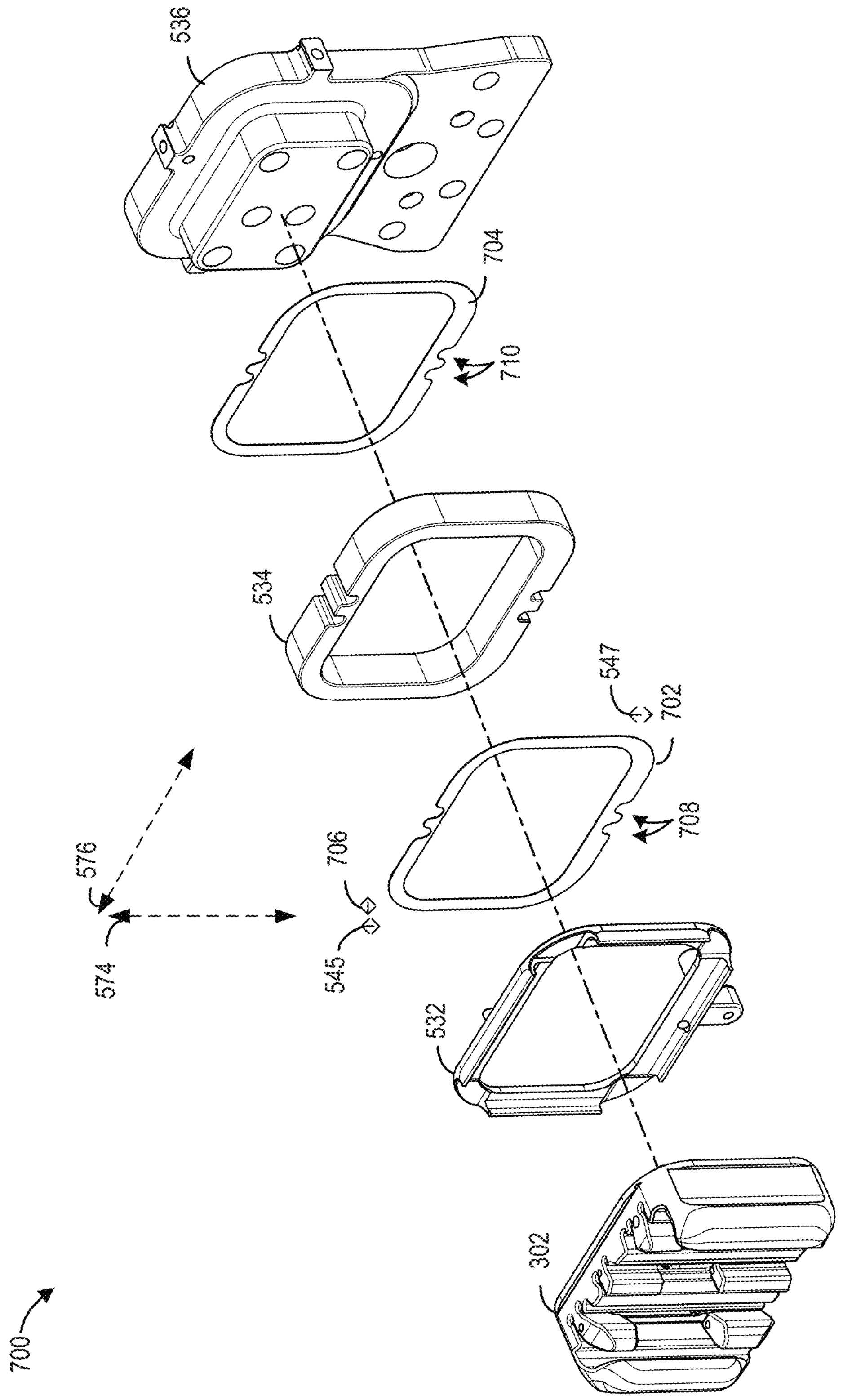
FIG. 7 shows an exploded view of mounting elements of the cathode cup.
Figure 8:
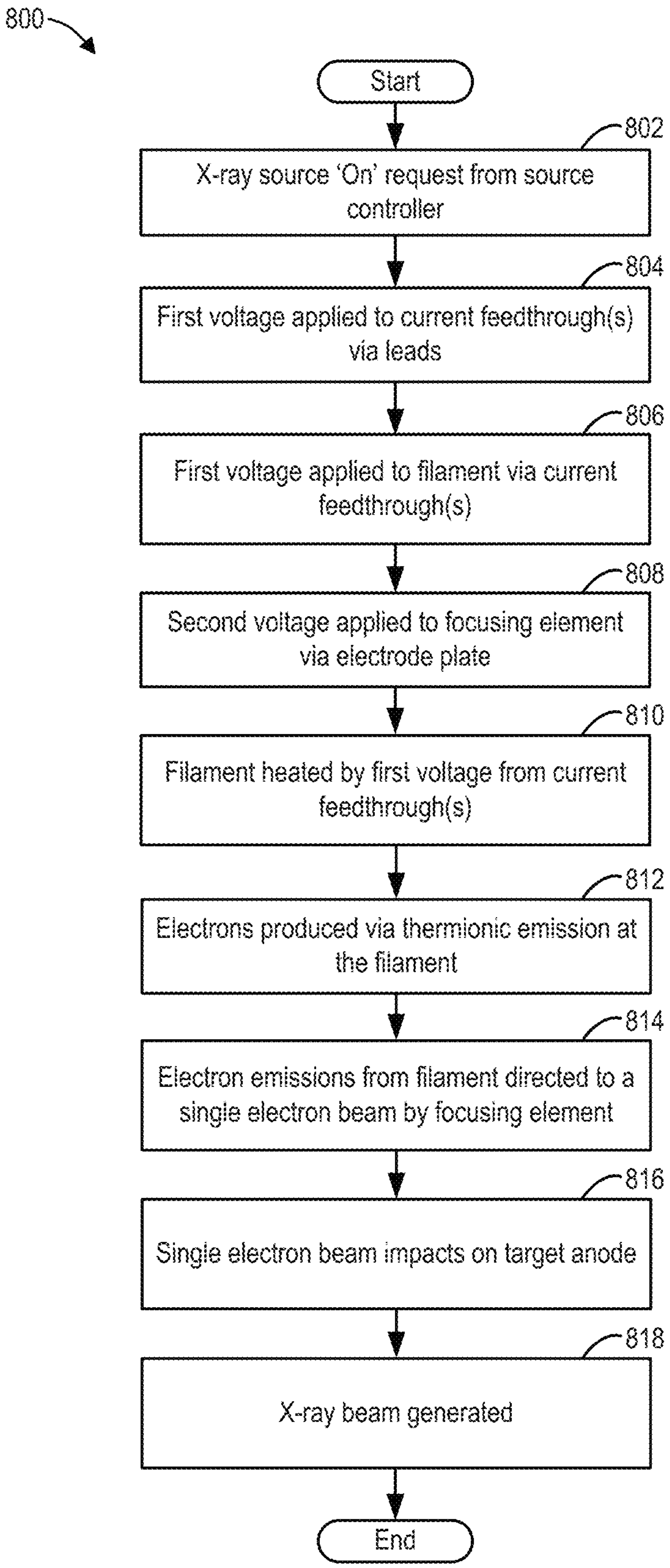
FIG. 8 illustrates a method for generating electrons and focusing electrons into an electron beam.

The following description relates to a focusing element for a cathode of an X-ray tube. The X-ray tube may be included in an X-ray imaging system, an example block diagram of which is shown in FIG. 1. The X-ray imaging system may be an interventional radiography imaging system, a fluoroscopic imaging system, a mammography imaging system, a fixed or mobile radiography (RAD) imaging system, a tomographic imaging system, a computed tomography (CT) imaging system, and so on. The X-ray imaging system includes an X-ray source or tube to generate irradiating X-ray beams. A cross-sectional view of one example of an X-ray tube is shown in FIG. 2. The X-ray tube includes an anode assembly and a cathode assembly, the latter of which is shown in FIG. 3. The cathode is configured with filaments that, when heated by a current, emit electrons. FIG. 4 shows a cross-sectional view of the cathode assembly, including details of a cathode cup and a focusing element. The cathode cup and the focusing element may be used to focus emitted electrons into a single electron beam directed towards the anode, and to influence the size and position of the X-ray emitting spot. A top down view and cross-sectional view of the cathode cup and the focusing element are shown in FIGS. 5A and 5B, respectively. FIG. 6 illustrates details of the focusing element geometry and how the focusing element may be coupled to the cathode cup and the cathode assembly. An exploded view of elements of the cathode cup is shown in FIG. 7. FIG. 8 illustrates a method for generating electrons from a plurality of filaments and focusing emitted electrons into an electron beam.

FIGS. 2-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a block diagram is shown of an embodiment of an imaging system 10 configured both to acquire original image data and to process the image data for display and/or analysis in accordance with exemplary embodiments. It will be appreciated that various embodiments are applicable to numerous X-ray imaging systems implementing an X-ray tube, such as X-ray radiography (RAD) imaging systems, X-ray mammography imaging systems, fluoroscopic imaging systems, tomographic imaging systems, or CT imaging systems. The following discussion of imaging system 10 is merely an example of one such implementation and is not intended to be limiting in terms of modality.

As shown in FIG. 1, imaging system 10 includes an X-ray tube or X-ray source 12 configured to project a beam of X-rays 14 through an object 16. Object 16 may include a human subject, pieces of baggage, or other objects desired to be scanned. X-ray source 12 may be conventional X-ray tubes producing X-rays 14 having a spectrum of energies that range, typically, from thirty (30) keV to two hundred (200) keV. The X-rays 14 pass through object 16 and, after being attenuated, impinge upon a detector assembly 18. Each detector module in detector assembly 18 produces an analog electrical signal that represents the intensity of an impinging X-ray beam, and hence the attenuated beam, as it passes through the object 16. In one embodiment, detector assembly 18 is a scintillator based detector assembly, however, it is also envisioned that direct-conversion type detectors (e.g., CdTe, CZT or Si detectors, etc.) may also be implemented.

A processor 20 receives the signals from the detector assembly 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the imaging system 10 and view the reconstructed image or other data from computer 22 on a display unit 26. Additionally, operator console 24 allows an operator to store the generated image in a storage device 28 which may include hard drives, floppy discs, compact discs, etc. The operator may also use operator console 24 to provide commands and instructions to computer 22 for controlling a source controller 30 that provides power and timing signals to X-ray source 12.

FIG. 2 illustrates a cross-sectional view of an X-ray source 200 which may be included in the imaging system of FIG. 1. For example, the X-ray source 200 may be an exemplary embodiment of the X-ray source 12 of FIG. 1, formed of an X-ray tube 40 that includes an anode assembly 42 and a cathode assembly 44. A set of reference axes 201 are provided for comparison between views shown, indicating an x-axis, a y-axis, and a z-axis. X-ray tube 40 is supported by the anode and cathode assemblies 42, 44 within an envelope or frame 46, which houses an anode 48 with a target 66, a bearing assembly 50, and a cathode 52. Frame 46 defines an area of relatively low pressure (e.g., a vacuum) compared to ambient, in which high voltages may be present. Frame 46 may be positioned within a casing (not shown) filled with a cooling medium, such as oil, that may also provide high voltage insulation. While the anode 48 configured with target 66 is described above as being a common component of X-ray tube 40, the anode 48 and target 66 may be separate components in alternative X-ray tube embodiments.

In operation, an electron beam is produced by cathode assembly 44. In particular, cathode 52 receives one or more electrical signals via a series of electrical leads 56. The electrical beam occupies a space 54 between the cathode 52 and the target 66 of the anode 48. The electrical signals may be timing/control signals that cause cathode 52 to emit the electron beam at one or more energies and at one or more frequencies. The electrical signals may also at least partially control the potential between cathode 52 and anode 48. Cathode 52 includes a central insulating shell 58 from which a mask 60 extends. Mask 60 encloses electrical leads 56, which extend to a cathode cup 62 mounted at the end of mask 60. In some embodiments, cathode cup 62 serves as an electrostatic lens that focuses electrons emitted from a filament within cathode cup 62 to form the electron beam.

X-rays 64 are produced when high-speed electrons of the electron beam are suddenly decelerated when directed from the cathode 52 to the target 66 formed on the anode 48 via a potential difference therebetween of, for example, sixty (60) thousand volts or more in the case of CT applications. The X-rays 64 are emitted through a radiation emission passage 68 formed in frame 46 toward a detector array, such as detector assembly 18 of FIG. 1.

Anode assembly 42 includes a rotor 72 and a stator (not shown) located outside X-ray tube 40 and surrounding rotor 72 for causing rotation of anode 48 during operation. Anode 48 is supported in rotation by a bearing assembly 50, which, when rotated, also causes anode 48 to rotate about the centerline 70. As shown, anode 48 has an annular shape, which contains a circular opening 74 in the center thereof for receiving bearing assembly 50.

Anode 48 may be manufactured to include a number of metals or alloys, such as tungsten, molybdenum, copper, or any material that contributes to bremsstrahlung (e.g., deceleration radiation) when bombarded with electrons. Target 66 of anode 48 may be selected to have a relatively high refractory value so as to withstand the heat generated by electrons impacting anode 48. Further, the space between cathode assembly 44 and anode 48 may be evacuated in order to minimize electron collisions with other atoms and to maximize an electric potential.

To avoid overheating of the anode 48 when bombarded by the electrons, rotor 72 rotates anode 48 at a high rate of speed (e.g., 90 to 250 Hz) about a centerline 70. In addition to the rotation of the anode 48 within frame 46, in a CT application, the X-ray tube 40 as a whole is caused to rotate about an object, such as object 16 of imaging system 10 in FIG. 1, at rates of typically 1 Hz or faster.

Bearing assembly 50 may have different forms, such as with a number of suitable ball bearings, but in the illustrated exemplary embodiment comprises a liquid metal hydrodynamic bearing having adequate load-bearing capability and acceptable acoustic noise levels for operation within imaging system 10 of FIG. 1.

In general, bearing assembly 50 includes a stationary component, such as center shaft 76, and a rotating portion, such as sleeve 78 to which the anode 48 is attached. While center shaft 76 is described with respect to FIG. 2 as the stationary component of bearing assembly 50 and sleeve 78 is described as the rotating component of bearing assembly 50, embodiments of the present disclosure are also applicable to embodiments wherein center shaft 76 is a rotary shaft and sleeve 78 is a stationary component. In such a configuration, anode 48 would rotate as center shaft 76 rotates.

Center shaft 76 may optionally include a cavity or coolant flow path 80 though which a coolant (not shown), such as oil, may flow to cool bearing assembly 50. As such, the coolant enables heat generated from anode 48 of X-ray tube 40 to be extracted therefrom and transferred external from X-ray tube 40. In straddle mounted X-ray tube configurations, coolant flow path 80 extends along a longitudinal length of X-ray tube 40, e.g., along the centerline 70. In alternative embodiments, coolant flow path 80 may extend through only a portion of X-ray tube 40, such as in configurations where X-ray tube 40 is cantilevered when placed in an imaging system.

FIG. 3 shows a perspective view 300 of a cathode assembly 320, which may be an embodiment of the cathode assembly 44 of FIG. 2. Geometry of the cathode assembly 320 will be further described in FIG. 4. The cathode assembly 320 may include a central insulating shell 308 from which a mask (not shown) extends with a cathode 305 mounted at the end of the mask. A cathode cup 306 of the cathode 305 is configured with a focusing element 302 and a plurality of filaments 303. In some embodiments of a conventional cathode, the cathode cup serves as an electrostatic lens that focuses electrons emitted from a thermionic filament within the cathode cup to form an electron beam. The embodiment of FIG. 3 includes the focusing element 302 within the cathode cup 306 to further focus electrons emitted from the plurality of filaments 303 to form an electron beam. The focusing element may be a monolithic structure with at least one channel with a filament positioned therein, and at least one focusing feature on each of a first and a second lateral side of the channel, as further described in FIG. 6.

FIG. 4 shows a cross-sectioned side view 400 of the cathode assembly 320. The cathode assembly 320 may include the elements described above with reference to FIG. 3, as well as a ridge structure 412 extending from the central insulating shell 308, a plurality of electrical leads 405, a plurality of current feedthroughs 415, and a plurality of bolts 423. The cathode 305 may be a disk-like structure with a first length 404. The central insulating shell 308 may be configured as a disk-like structure of a second length 402 with the ridge structure 412 extending a length 406 from a first face 414 of the central insulating shell 308. A mask 416 extends from a center of the first face 414 of the central insulating shell 308. The mask 416 has a length 418 extending through the second length 402 of the central insulating shell 308 and the length 406 of the ridge structure 412. The length 418 includes a first portion of the mask 416 protruding from a second face 420 of the central insulating shell 308, a second portion equivalent to the combined second length 402 of the central insulating shell 308 and the length 406 of the ridge structure 412, and a remaining third portion extending from the first face 414 of the central insulating shell 308.

A first diameter 428 of the central insulating shell 308 may be larger than a second diameter 426 of the cathode 305. A third diameter 424 of the mask 416 may be smaller than the first diameter 428 of the central insulating shell 308 and the second diameter 426 of the cathode 305. Geometry of the cathode cup 306 will be further described in FIGS. 5A and 5B.

The mask 416 encloses the plurality of electrical leads 405, which extend to the cathode cup 306 mounted on the cathode 305 at the end of the mask 416. The cross sectioned side view 400 shows six leads, where four of the six leads are coupled to each of three filaments to provide a drive current via a current feedthrough. For example, a first lead 434 may be coupled to a filament of the plurality of filaments 303 via a first current feedthrough 435. A second lead 444 may be coupled to a second current feedthrough 437. A third lead 432 may be coupled to a third current feedthrough 445. A fourth lead 446 may be coupled to a fourth current feedthrough 433. A fifth lead 430 may be coupled to a one-piece electrode, for example, a focusing element, via an electrode plate to provide a current, to be further described below. For example, the fifth lead 430 may be coupled to the electrode plate via a fifth current feedthrough 431. A sixth lead 436 may be coupled to the cathode assembly 320. The first, second, third, fourth, and fifth leads 434, 444, 432, 446, 430 may provide the drive current using a current return through an electrical common connection via the cathode assembly 320 and the sixth lead 436.

The cathode 305 may be coupled to the mask 416 by the plurality of bolts 423. The cathode cup 306 may be bolted at an angle α relative to the cathode 305 and the rest of the cathode assembly 320. In one example, the bolting angle α may be 10 degrees.

A conventional cathode assembly produces an electron beam to be imparted on an anode assembly, and thereby produce X-rays, by focusing electrons emitted from multiple sources. In one example, the electron emitting sources may be coiled filaments. A cathode assembly may be configured with a plurality of filaments, which may be formed of tungsten, with each individual filament positioned between and coupled to a pair of high voltage current feedthroughs. An electric current is applied to the plurality of filaments via the current feedthroughs, which induces electrons to be liberated from the filaments by thermionic emission. The plurality of filaments may be positioned within a focusing element which, along with a size and positioning of each filament, may control a direction of emitted electrons to form a focused direction and shape of a single electron beam. The focusing element may be configured with an internal architecture including an amount, a width, a height, a depth and a configuration of a plurality of channels in which the filaments are positioned to assist with electron beam focusing.

A conventional cathode focusing element, for example, as shown in U.S. Pat. No. 5,623,530A by Lu and Waite, may be configured with a focus tab to direct electrons emitted from two filaments, each positioned in a channel of similar widths, into individual electron beams for each filament. As electrons are emitted and move away from each of the two filaments towards the anode target, the electrons may move along a path of a channel edge for a distance which the channel extends. In one embodiment, the channels may be of similar widths and be configured with edge focusing, including a sharp, e.g., 90-degree, edge for each channel in which a filament is positioned. The channel edge may be in close proximity to the filament, for example, a distance 100 μm to 300 μm. The channel edge may also be operated at a cathode potential, e.g., voltage equivalent to that of the cathode assembly, and may be biased negatively with respect to the filament (e.g., a negative bias potential), which may help control focal spot size or may grid electron emissions. Upon moving beyond the channel edge, the electrons may have a broad spread as opposed to traveling along a linear path to the anode target. Filaments may be positioned at similar vertical heights with respect to a base of the focusing element and may have a similar lateral positioning along a width of the focusing element with respect to each of two opposite edges.

However, the conventional cathode focusing element presents a number of potential challenges. As described above, though coiled filaments may be a simple and robust election source, the conventional focusing element configuration may reduce a useful life of the filament and therefore the cathode. First, the proximity of the filament to the channel edge, e.g., the gap between the filament and the respective channel edge, may be too close/too small and result in the grid voltages exceeding a breakdown threshold, beyond which the filament and/or channel edge may be degraded and both accuracy and precision of the electron beam directed to the anode may be degraded. The threshold may be further exceeded if, under nominal operation, a position of the filament within the channel shifts so that a gap between the filament and the channel edge on one side of the filament is larger or smaller than a gap on the other side of the filament. In another example, the threshold may be further exceeded if debris particles migrate to the gap, further reducing the gap distance. The voltage applied to the channel edge, which may be similar to the voltage applied to the filaments, may help direct emitted electrons by charge repulsion, however the filaments may experience high voltage instability due to the small gap between the filament and the channel edge. Additionally, gaps within a distance range allow electrons emitted by an energized filament to be focused into a single electron beam by channel edge focusing. The sharp channel edge may have a low focusing tolerance, as the emitted electrons may be undesirably deflected due to machining imperfections and close proximity of the channel edge. The conventional cathode focusing element may also have a narrow imaging capacity where the focusing element is configured with only two filaments, each positioned in a channel with a similar geometry. The filaments may have different configurations with respect to a coil diameter and a filament length, which may allow for imaging of smaller objects or larger objects at a higher resolution when using a smaller filament compared to a larger filament.

The inventors herein propose an X-ray tube cathode focusing element configured with at least one channel with an electron emission source (e.g., filament) positioned therein, with at least one focusing feature on either lateral side of the channel. The cathode focusing element further includes integrated edge focusing and a bias voltage. The bias voltage applied to the channel edge may be between −100V and −1000V, which may inhibit electron emission from the sides and the back of the filament, thus restricting emitted electrons to be focused through the channel. A bias voltage for the entirety of the focusing element architecture may be equivalent to the bias voltage applied to the channel edges but different from the voltage applied to the filaments and a voltage applied to the cathode base. Additionally, a gap distance between the channel and the respective filament may be increased to at least a threshold distance. For example, the threshold distance may be at least 600 μm. The negative bias voltage as well as the larger gap between the channel edge and the filament may allow the cathode assembly to be configured with filaments, and therefore channels, of various sizes. Implementation of different sized filaments may allow focusing over a range of resolutions and object sizes. Additionally, the larger gap may relieve electron stress between the filament and the channel which, when electron stress is present, may reduce an ability to control the electron beam shape and/or trajectory and may lead to high voltage instability. Rounded channel edges may further assist in focusing emitted electrons.

The focusing element may be positioned with a first side adjacent to a first side of an electrode plate, where the electrode plate is configured with a second side adjacent to an insulator. The insulator may be positioned between the electrode plate and a cathode base, thus separating the voltages of the cathode base and the electrode plate. The electrode plate may be coupled to electrode current feedthrough which provides a voltage to the electrode plate. As the electrode plate is coupled to the focusing element, the voltage applied to the electrode plate is imparted on the focusing element. In one example, the focusing element may be configured with three channels, each with a filament positioned therein. Filaments may be coupled to two current feedthroughs on either end of the filament. In the current embodiment, the current feedthroughs at each end of the filaments are integrated into the focusing element and therefore also receive the same voltage applied to the electrode plate. This design may reduce the number of individual parts comprising the cathode assembly 320 that may be placed separately during manufacturing. The bias voltage applied to the current feedthroughs at each end of the filament may reduce a length of the focal spots by a small amount compared to an amount by which the bias voltage reduces or directs a width of the electron beam. Therefore, the focusing element mainly focuses the width of the electron beam.

FIGS. 5A and 5B show a top view 500 and a side view 550, respectively, of the cathode cup 306 configured with a plurality of electron sources (such as the plurality of filaments 303), the focusing element 302, an electrode plate 532, an insulator 534, and a cathode base 536. A set of reference axes 530 is provided for comparison between views, indicating a y-axis, an x-axis, and a z-axis. In some examples, the y-axis may be parallel with a direction of gravity (e.g., a vertical direction), the x-axis parallel with a horizontal direction, with the z-axis perpendicular to both the y-axis and the x-axis. The cathode cup 306 may be a hollow rectangular shell formed of a metal such as, for example, nickel or Kovar, with an open top and an open bottom surrounding the plurality of filaments 303, and the focusing element 302, to be further described below. The cathode cup 306 may have a width 501 parallel with the z-axis and a length 503 parallel with the x-axis. The width 501 may be greater than the length 503. A height 505 of the cathode cup 306, parallel with the y-axis, may be sufficient to encompass a majority of the internal components of the cathode cup 306, listed above. A height 507 of the focusing element 302 may extend beyond the height 505 of the cathode cup 306. The height 507 may be less than a quarter of the height 505. The cathode cup 306 may include a protruding hollow rectangular portion 514 along the width 501 of one face of the cathode cup 306, where the protruding portion 514 has a closed top. The protruding portion 514 may have a width 509, a length 511, and a height 513. The width 509 and length 511 may each be less than a quarter of the width 501 and length 503, respectively. The height 513 may be approximately half of the height 505. The protruding portion 514 may cover the fifth current feedthrough 431, not shown in FIG. 5A.

The cathode cup 306 may be configured with the plurality of electron sources, herein referred to as "filaments" 303, including a second, small filament 502, a first, medium filament 504, and a third, large filament 506. A diameter 515 of the small filament 502 and the medium filament 504 may be approximately equivalent. A diameter 517 of the large filament 506 may be larger than the diameter 515 of each of the small filament 502 and the medium filament 504. A length 519 of the small filament 502 may be shorter than a length 521 of the medium filament 504 and which may in turn be shorter than a length 523 of the large filament 506. Each filament may be a coil formed of a metal, for example, tungsten, positioned between a pair of high voltage current feedthroughs configured to control a direction and shape of the electron beam. While each filament may be coupled to a pair of current feedthroughs, one or both of the current feedthroughs may be coupled to a lead, as described above with reference to FIG. 4. For example, as described above in FIG. 4 and as shown in FIG. 5B, the medium filament 504 is coupled to the first and third current feedthroughs 435, 445. The large filament 506 is coupled to the fourth current feedthrough 433. Therefore, for the three filaments of the plurality of filaments 303, five connections to leads of the plurality of leads 405 are made.

Each current feedthrough may be configured with a leg encased in an insulating sleeve, for example, a leg of the third current feedthrough 445 may be encased in a leg insulator 535. An electric current may be applied to the filaments via the current feedthroughs, which may cause electrons to be produced by thermionic emission. In this way, each filament may be insulated independently from the insulator, wherein the insulator insulates the cathode base from the focusing element and the leg insulator 535 insulates the filament from the focusing element and cathode base.

The cathode cup 306 may also be configured with the focusing element 302, which may be formed of a refractory metal, such as, for example, Kovar or Niobium. The focusing element 302 may have a first length 552, a first width 554, and a height 556. The focusing element 302 may be configured with rounded edges at the top, which will be further described in FIG. 6, resulting in a second, top length that may be shorter than the first length 552 and a second, top width that may be shorter than the first width 554. A bottom face of the focusing element 302 may be configured with a hollow space 560, to be further described in FIG. 6. The focusing element 302 may be configured with a separate channel to house each filament. Each channel may have an opening slot parallel with the plane of the focusing element 302. For example, the medium filament 504 may be positioned inside a first channel 520, which may have a first length 522, a second length 524, a width 526, and a height 528. The first length 522 may be a length of the channel below the medium filament 504 for a height 528*a* and the second length 524 may be a length of the channel at and above the medium filament 504 for a height 528*b*. The dimensions of each channel for the small filament 502 and the large filament 506 may be similarly configured with a second length of the channel at and above the filament that may be longer than a first length of the channel below the filament. The small filament 502 may be positioned inside a second channel 544, which may have a third length 508 and a width 510, as well as a fourth length and a height, further described in FIG. 6. The large filament 506 may be positioned inside a third channel 548, which may have a fourth length 512 and a width 516, as well as a fifth length and a height, further described in FIG. 6. The dimensions of each channel may be configured so that there is a gap between a channel edge and the filament of at least a threshold distance. In one example, the threshold distance may be at least 600 μm, that is to say there may be a length of 600 μm between each channel edge and the respective filament. Each channel may also be configured with a lateral filament alignment channel adjacent to each end of the filament. For example, the first channel 520 may be configured with a first alignment channel 540 and a second alignment channel 542, which may allow for positioning of the medium filament 504 within the first channel 520. The alignment channels may be of a similar width and a similar height relative to each other. A length 543 of the first alignment channel 540 may be shorter than a length 546 of the second alignment channel 542. The bottom face of the focusing element 302 may be configured with a protruding lip 562 which may extend along the non-rounded lengths and widths of the focusing element 302 with a height 564. Further details of configuration of the focusing element 302 are described below in reference to FIG. 6.

The focusing element 302 is seated on the electrode plate 532, which may be coupled to the fifth current feedthrough 431 of FIG. 4, which is housed in the protruding portion 514 in FIGS. 5A and 5B. The fifth current feedthrough 431 may deliver a voltage to the electrode plate 532, which may then transfer the voltage to the focusing element 302, imparting a charge on the focusing element 302. In one example, the voltage of the focusing element 302 may be between −100 and −1000V. In another example, the voltage of the focusing element 302 may be between −100 and −500V. The electrode plate 532 may have a length 574, a width 576, and a height 578, and be configured with rounded edges, as further shown in FIG. 7. The electrode plate 532 may be configured as a ring with a hollow center, with a first wall thickness 547 and a second wall thickness 545, where the first wall thickness 547 may be greater than the second wall thickness 545. The electrode plate 532 may also be configured with a protruding lip 572 with a height equivalent to the height 564 of the focusing element 302 protruding lip 562, spanning the non-rounded length 574 and width 576 of the electrode plate 532.

The electrode plate 532 is seated on the insulator 534, which may be formed of ceramic. The insulator 534 may have a length similar to the length 574 and a width similar to the width 576 of the electrode plate 532, and a height 580, which may be greater than the combined heights 578 and 564 of the electrode plate 532. Similar to the electrode plate 532, the insulator 534 may be configured as a ring with a hollow center, with a first wall thickness 547 and a second wall thickness 545. The first wall thickness 547 may be equal to the second wall thickness 545, in one example. In a second example, the first wall thickness 547 may be different from (e.g., greater than or less than) the second wall thickness 545. The first wall thickness 547 and the second wall thickness 545 may be adjusted during manufacturing of the insulator 534 based on balancing of thermal conduction and voltage standoff.

The insulator 534 is positioned between the electrode plate 532 and the cathode base 536. The cathode base 536 may be formed of a metal, for example steel or Kovar. The cathode base may have a length 582, a first width equivalent to the width 576 of the electrode plate 532, a second width 584, and a third width 586. The insulator 534 may serve to separate the focusing element 302 from the cathode base 536, which may diminish stress on the leg insulator 535 from the gridding voltage, as is typical in conventional cathodes.

The first width may extend along a portion 582*a* of the length 582, taper to the second width 584, which then flares out along a portion 582*b* of the length 582 to the third width 586. The third width 586 may extend along a portion 582*c* of the length 582. The first width may be larger than the second width 584 and smaller than the third width 586. In one example, all edges of the cathode base 536 may be rounded.

The cathode base 536 may have a three tiered height, a first height 590 that may slope up to a second height 592, which may be configured in a stepwise manner to a third height 594. The first height 590 may extend underneath the protruding portion 514 of the cathode cup 306 with a circular opening for the fifth current feedthrough 431 to pass through, as shown in FIG. 7. The insulator 534 may rest on top of the second height 592. The third height 594, with a length 582*d*, may extend up into the open space of the insulator 534, the electrode plate 532, and the hollow space 560 of the focusing element 302. The cathode base 536 may be configured with hollow chambers, as further shown in FIGS. 6-7, that house the legs, for example a chamber 581 may house the leg of the third current feedthrough 445 connected to the medium filament 504. The hollow chambers may extend the full height of the third height 594 and the legs may extend a height of the hollow space 560, as further described in FIG. 6. The cathode base 536 may also be configured with mountings, for example, mounting 577, which may couple the cathode base 536 to the cathode cup 306 and the cathode 305 of FIGS. 3-4. In one example, there may be three mountings, one approximately centered along each length 582 and the first width with no mounting along the third width 586. The region of the cathode base 536 where the second width 584 flares out along the portion 582*b* to the third width 586 may include a plurality of bolt housings, where bolts such as the plurality of bolts 423 may bolt the cathode cup 306 to the mask 416 at an angle α relative to the rest of the cathode assembly 320, as shown in FIG. 4.

Turning to FIG. 6, a cross-sectioned side view 600 of the focusing element 302, the electrode plate 532, the insulator 534, and the cathode base 536 is shown. The focusing element 302 may be configured as a continuous single architecture (e.g., a monolithic structure) gridding electrode with electron emitting filaments positioned in each of at least three channels with geometry to focus emitted electrons into a single electron beam. The focusing element 302 may have a bowl shape, e.g., the sides of the focusing element may have a taller height compared to a center of the focusing element. For example, the focusing element may have a first side height 633 greater than a second interior height 635.

The focusing element geometry may include a first lateral edge feature 602 and a second lateral edge feature 604 on opposite ends of the first width 554. Each of the first and the second lateral edge features 602, 604 may be configured with a lateral recess 606, which may assist in focusing the electron beam. Each lateral recess 606 of the first and the second lateral edge features 602, 604 is positioned at a vertical height greater than a vertical height of an adjacent filament, where the recess vertical height is defined as a distance from a bottom point of the recess to the first face of the focusing element 302. For example, the lateral recess 606 of the first lateral edge feature 602 may be positioned at a height 623 which may be greater than the third height 608 of the first channel 520. Edges of the lateral recesses 606 may be rounded.

Each of the small, medium, and large filaments 502, 504, 506 are positioned in individual channels where the channels may have four surrounding walls in the same plane as the individual filament, as described in FIG. 5B. Each of the four walls of each filament channel may have a different height. Filament height is defined as a vertical distance from a lowest point on a circumference of the filament, with regards to a vertical axis, to a first face of the focusing element, which is adjacent to the second side of the insulator. For example, the first height and the second height of the first channel 520 along the widths 526 may be equivalent to the height 528*b* as described in FIG. 5B. A first side of the first channel 520 having the second length 524 may have a third height 608, as described in FIG. 5B, while a second side opposite the first side of the first channel 520 may have a small (e.g., negligible) wall height. The second channel 544, which houses the small filament 502, may have a similar first height and second height similar along the width 516, and approximately equivalent heights 612 along the third length 508 of the channel. The third channel 548, which houses the large filament 506, may have similar channel heights to the first channel 520, where a first height 616 along the first side having length 512 is greater than a second height 614 along a second side opposite the first side, also having length 512.

As described in FIG. 5B, the channels may have a first portion adjacent to and above the filament and a second portion below the filament. The length of the second portion may be greater than the length of the first portion and have a uniform height for both lengths and widths, as shown in FIG. 5B. The second portion of the channels may have a different height for each of the three channels. For example, the second portion of the first channel 520 may have a height 610, the second portion of the second channel 544 may have a height 618, and the second portion of the third channel 548 may have a height 620. The filament may be positioned approximately at the center of the respective channel with regards to the channel width. For example, each filament may be positioned a distance 622 from each of the channel walls. In one example, the distance 622 may be at least 600 μm.

A first focusing feature 624 is positioned between the first channel 520 and the second channel 544, and a second focusing feature 626 is positioned between the second channel 544 and the third channel 548. Each of the first and the second focusing features 624, 626 may be configured with a geometry to focus the electrons emitted from the filaments on either side into the single electron beam for the focusing element 302. The first, second, and third channels 520, 544, 548, and therefore the first, second, and third filaments 504, 502, 506 may be spaced apart by a width of the focusing features. For example, the first and second channels 520, 544 may be positioned apart by a width 628 and the second and third channels 544, 548 may be positioned apart by a width 630. As the filaments are centered in the respective channel width, as described above, a distance between each filament may be greater than the distance between each channel. The first and second lateral edge features 602, 604, and the first and second focusing features 624, 626 are configured as a continuous, single architecture.

The focusing element geometry for the focusing element 302, including channel walls, lateral edge features, and focusing features is configured with integrated edge focusing, where an edge of the focusing element, for example, an edge 632, is rounded, such as, for example, with a radius of at least 120 μm, as opposed to a sharp edge defined as having a radius of less than 80 μm, e.g., a 90-degree intersection of two straight planes. In one example, all edges of the focusing element geometry are configured as rounded edges.

The focusing element 302 may be configured with the hollow space 560 below the plane of the filaments, as described in FIG. 5B, through which the insulated legs may pass. The hollow region may have a height 634 and a width 636.

As described above, the filaments may be spaced apart laterally by a width of the focusing features. Each of the filament of the first channel, the filament of the second channel, and the filament of the third channel has an unequal lateral spacing with regards to adjacent filaments, wherein lateral spacing is defined as a lateral distance, with regards to a horizontal axis, between a center point of a first filament diameter to a center point of a second filament diameter. Specifically, the small filament 502, which may be positioned between the medium filament and the large filament, may be offset from the center of the total width (e.g., equal to the first width 554) of the focusing element 302. Ions emitted from the electron beam impacting the anode target, such as the target 66 of the anode 48 of FIG. 2, may be most likely to impact the center of the focusing feature. Therefore, by positioning the small filament to the left of a center point of the focusing feature, potential degradation of the filament may be prevented. In one example, the small filament may be a distance 638 from the edge of the focusing element, where the distance 638 is less than one half the total width of the focusing element 302. The medium filament may be positioned a distance 640 to the left of the small filament 502 and the large filament may be positioned a distance 642 to the right of the small filament 502.

To focus emitted electrons from an energized filament into a single electron beam, both a size and a position of the filament are considered, as the size and position of each filament may affect direction of emitted electrons. The filaments may be positioned at different vertical heights to direct electron emissions into the single electron beam, where the filament vertical height is defined as a distance from a lowest point on a circumference of the filament to a first face of the focusing element 302 adjacent to a second side of an insulator 534. In one example, the medium filament 504 may be positioned at the height 610 in relation to the top of the hollow space 560 of the focusing element 302. The height 610 may be greater than the height 620 at which the large filament 506 is positioned, which may be greater than the height 618 at which the small filament 502 is positioned.

As the filaments are charged with a voltage via current feedthroughs to heat the filament and emit electrons, the legs of each filament, for example, legs of the first current feedthrough 435 and the third current feedthrough 445 of the medium filament 504, may be insulated, for example, by the leg insulator 535, to minimize charge lost to the environment and isolate a current feedthrough charge from a charge imparted on the focusing element 302, a charge of the electrode plate 532, and a charge of the cathode base 536, to be further described below.

To further focus the electrons emitted from each filament into the single electron beam, a bias voltage, herein referred to as a "gridding voltage" is applied to the focusing element 302 via the electrode plate 532. For example, the gridding voltage applied to the focusing element 302 may be a negative voltage between −100 and −1000V, relative to a charge applied to the cathode base. In another example, the gridding voltage may be between −200 to −400V. Application of the gridding voltage to the focusing element 302 may serve to inhibit electron emission from the sides and back of the filament. The insulator 534 may be positioned between the electrode plate 532 and the cathode base 536 so as to inhibit voltage transfer between the electrode plate 532 and the cathode base 536.

FIG. 7 shows an exploded view 700 of mounting components housed in the cathode cup 306. In addition to the previously described focusing element 302, electrode plate 532, insulator 534, and cathode base 536, the cathode cup 306 may also house a first spacer plate 702 and a second spacer plate 704. In one example, the first spacer plate 702 and the second spacer plate 704 are formed of braze foil. The insulator 534 and the first and the second spacer plates 702, 704, may have a third wall thickness 706 along the length 574 of each element. The insulator 534 and the first and the second spacer plates 702, 704, may also be configured with two indentations 708, 710 which may be centered along the width 576 of each element and which may span the height 580 of the insulator 534 and a third height of the first and the second spacer plates 702, 704 less than the height of the electrode plate 532. The indentations 708, 710 may couple the electrode plate 532, the insulator 534, and the cathode base 536. The first spacer plate 702 may be sandwiched between the electrode plate 532 and the insulator 534. The second spacer plate 704 may be sandwiched between the insulator 534 and the cathode base 536. Both the first and the second spacer plates 702, 704, may be configured with similar dimensions and geometry to each other, the electrode plate 532, the insulator 534, and the cathode base 536, including the length 574 and the width 576. The first and the second spacer plates 702, 704 may be ring-like structures with similar inner dimensions as the insulator 534 and the cathode base 536, with a first wall thickness 547 and a second wall thickness 545 along the width 576, where the first wall thickness 547 may be greater than the second wall thickness 545. The ring-like structure may allow the third height 594 of the cathode base 536 to protrude through the centers of the spacer plates 702,704, the insulator 534, and the electrode plate 532.

FIG. 8 depicts an example method 800 for generating and focusing an X-ray beam in response to a source controller request. Method 800 may be implemented at an X-ray source, such as the X-ray source 12 of FIG. 1, adapted with an X-ray tube configured with a cathode, including a focusing element, such as the focusing element 302 of FIGS. 3-7. The focusing element may be configured with at least three channels of different widths, a filament arranged in each of the at least three channels, at least two focusing features, at least two lateral edge features, and with all edges of the focusing element being rounded. Instructions for carrying out method 800 may be executed by a controller, such as the source controller 30 of FIG. 1, based on instructions received by the source controller from the operator console 24 via the computer 22.

The method 800 begins at 802, where the X-ray source may receive an 'On' request from the source controller. In response to the 'On' request, a first voltage may be applied at 804 to each of the plurality of current feedthroughs coupled to a filament via the respectively coupled leads. The first voltage may be applied to the filament via current feedthroughs coupled to the filament at 806. Additionally, a second voltage may be applied to the focusing element at 808 via the electrode plate. A current feedthrough coupled to an electrical lead may be coupled to the electrode plate, which is in face-sharing contact with the focusing element. A difference in charge between the first voltage and the second voltage may result in the focusing element being negatively biased in relation to the cathode base and the filament. As the electrode plate is spaced apart from the cathode base by the insulator and the legs are individually insulated, the first voltage and the second voltage may remain isolated to the elements at which they are applied. At 810, the first voltage applied to the current feedthrough(s) may heat the filament to which the current feedthrough(s) is/are coupled resulting in electrons being produced via thermionic emission at 812. In one example, one filament may be energized, e.g., have an applied voltage via the respective current feedthrough(s), at a time. At 814, electron emissions from the heated filament may be directed into a single electron beam by the relatively negatively-biased focusing element. The single electron beam may be further focused by the rounded edges of the focusing element, and the geometry of the focusing features and the lateral edge features, including at least one recess in each of the lateral edge features. The at least one recess may include rounded recess edges to assist in focusing emitted electrons. The single electron beam may impact on the anode target at 816, resulting in generation of an X-ray beam by the X-ray tube at 818. The method 800 ends.

The technical effect of an X-ray cathode focusing element configured as described above, for example, with three electron emission filaments, an integrated edge focusing, and a bias voltage, is that a useful lifetime of the electron emission filaments and the focusing element may be maintained or increased, and a scope of the imaging system focusing ability over a range of resolutions and object sizes may be broadened.

The disclosure also provides support for a cathode for an X-ray tube, comprising: a cathode base, an insulator having a first side adjacent to the cathode base and a second side opposite the first side, a focusing element adjacent to the second side of the insulator, the focusing element having at least one channel with a filament arranged therein, and at least one focusing feature on either side of the at least one channel. In a first example of the system, the at least one channel has rounded channel edges. In a second example of the system, optionally including the first example further including at least a threshold distance between the filament and edges of the at least one channel. In a third example of the system, optionally including one or both of the first and second examples, the threshold distance is 600 μm. In a fourth example of the system, optionally including one or more or each of the first through third examples, the at least one channel has a negative bias voltage applied thereto with respect to a voltage applied to the filament arranged in a respective channel. In a fifth example of the system, optionally including one or more or each of the first through fourth examples, the filament is insulated from the voltage of the focusing element by the insulator. In a sixth example of the system, optionally including one or more or each of the first through fifth examples, the at least one focusing feature on either side of the at least one channel in combination with the at least one channel forms a continuous single architecture bowl shape, where sides of the focusing element have a taller height compared to a center of the focusing element. In a seventh example of the system, optionally including one or more or each of the first through sixth examples, the focusing element includes lateral recesses with rounded recess edges. In an eighth example of the system, optionally including one or more or each of the first through seventh examples, the at least one channel includes a first channel, a second channel, and a third channel, where the second channel is positioned between the first channel and the third channel, and wherein each of the filament of the first channel, the filament of the second channel, and the filament of the third channel has a filament height, wherein the filament height is defined as a vertical distance from a lowest point on a circumference of the filament, with regards to a vertical axis, to a first face of the focusing element, which is adjacent to the second side of the insulator and the filament height of each channel is different. In a ninth example of the system, optionally including one or more or each of the first through eighth examples, each of the filament of the first channel, the filament of the second channel, and the filament of the third channel has an unequal lateral spacing with regards to adjacent filaments, wherein lateral spacing is defined as a lateral distance, with regards to a horizontal axis, between a center point of a first filament diameter to a center point of a second filament diameter. In a tenth example of the system, optionally including one or more or each of the first through ninth examples, a lateral spacing between the filament of the first channel and the filament of the second channel is different [greater than or less than] the lateral spacing between the filament of the second channel and the filament of the third channel. In an eleventh example of the system, optionally including one or more or each of the first through tenth examples, the filament of the second channel is offset laterally from a center point of a width of the focusing element.

The disclosure also provides support for an imaging system, comprising: an anode assembly, and a cathode assembly configured to focus an electron beam on the anode assembly, wherein the cathode assembly includes a monolithic focusing element with: at least one channel and a filament arranged therein, at least one recess at each of two lateral edge features, and at least two focusing features positioned between the two lateral edge features. In a first example of the system, each recess of the two lateral edge features is positioned at a first vertical height, with respect to a vertical axis, greater than a second vertical height of an adjacent filament. In a second example of the system, optionally including the first example, a first voltage is applied to the monolithic focusing element and a second voltage is applied to the filament, where the second voltage is different from the first voltage. In a third example of the system, optionally including one or both of the first and second examples, the at least one channel includes a first channel, a second channel, and a third channel, where the second channel is positioned between the first channel and the third channel, and wherein a second filament of the second channel is positioned at a third height, where the third height is less than a fourth height of a third filament of the third channel, and a first filament of the first channel is positioned at a fifth height, where the fifth height is greater than the fourth height. In a fourth example of the system, optionally including one or more or each of the first through third examples, the filament of the first channel, the filament of the second channel, and the filament of the third channel are each of different diameters and lengths, and the first channel, the second channel, and the third channel are each of different widths, relative to each other.

The disclosure also provides support for a cathode for an X-ray imaging system, comprising: a focusing element having a first side positioned adjacent to an electrode plate, and an insulator having a first side positioned adjacent the electrode plate and a second, opposite side adjacent to a cathode base, wherein the focusing element has at least three filaments of different sizes positioned in respective channels of different widths, where each of the at least three filaments are coupled to two current feedthroughs, each current feedthrough configured with a leg extending through a central, hollow space of the focusing element, the electrode plate, the insulator, and the cathode base. In a first example of the system, a portion of the leg that extends through the central, hollow space of the focusing element, the electrode plate, the insulator, and the cathode base is insulated independently of the insulator. In a second example of the system, optionally including the first example, a first voltage applied to the focusing element is between −200 to −400V, where the first voltage applied to the focusing element is negatively biased relative to a second voltage applied to the at least three filaments.

As used herein, an element or step recited in the singular and preceded with the word “a” or “an” should be understood as not excluding plural of said elements or steps, unless such exclusion is explicitly stated. Furthermore, references to “one embodiment” of the present disclosure are not intended to be interpreted as excluding the existence of additional embodiments that also incorporate the recited features. Moreover, unless explicitly stated to the contrary, embodiments “comprising,” “including,” or “having” an element or a plurality of elements having a particular property may include additional such elements not having that property. The terms “including” and “in which” are used as the plain-language equivalents of the respective terms “comprising” and “wherein.” Moreover, the terms “first,” “second,” and “third,” etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A cathode for an X-ray imaging system, comprising:

a focusing element having a first side positioned adjacent to an electrode plate; and an insulator having a first side positioned adjacent the electrode plate and a second, opposite side adjacent to a cathode base; wherein the focusing element has at least three filaments of different sizes positioned in respective channels of different widths, where each of the at least three filaments are coupled to two current feedthroughs, each current feedthrough configured with a leg extending through the cathode base and a central, hollow space of the focusing element, the electrode plate, and the insulator.

2. The cathode of claim 1, wherein a portion of the leg that extends through the central, hollow space of the focusing element, the electrode plate, the insulator, and the cathode base is insulated independently of the insulator.

3. The cathode of claim 1, wherein a first voltage applied to the focusing element is between −200 to −400V, where the first voltage applied to the focusing element is negatively biased relative to a second voltage applied to the at least three filaments.

4. The cathode of claim 1, wherein the focusing element is configured with integrated edge focusing, one or more edges of the channels are rounded with a radius of at least 120 micrometers.

5. The cathode of claim 1, wherein the insulator is formed of ceramic material.

6. The cathode of claim 1, wherein the electrode plate includes a protruding lip that spans the non-rounded length and width of the electrode plate to enhance structural stability.

7. The cathode of claim 1, wherein the focusing element includes a protruding lip extending along the non-rounded lengths and widths of the focusing element.

8. The cathode of claim 1, wherein the focusing element includes lateral recesses positioned at a vertical height greater than the height of the adjacent filament to assist in focusing the electron beam.

9. The cathode of claim 1, wherein the filaments are formed of tungsten and are positioned at different vertical heights relative to the focusing element.

10. The cathode of claim 1, wherein the channels are configured with a first portion adjacent to and above the filament and a second portion below the filament, where the second portion has a uniform height for both lengths and widths.

11. The cathode of claim 1, wherein the focusing element is configured with a bowl shape, where the sides of the focusing element have a taller height compared to the center of the focusing element.

* * * * *